United States Patent [19]

Buell

[11] Patent Number: 5,295,702

[45] Date of Patent: Mar. 22, 1994

[54] SINGLE SIDED CYCLE REAR SUSPENSION SYSTEM

[75] Inventor: Erik F. Buell, Mukwonago, Wis.

[73] Assignee: Buell Motor Company, Inc., Mukwonago, Wis.

[21] Appl. No.: 860,313

[22] Filed: Mar. 30, 1992

[51] Int. Cl.⁵ ............................................. B62K 25/28
[52] U.S. Cl. .................................... 280/284; 280/285; 180/227
[58] Field of Search ...................... 280/275, 281.1, 283, 280/284, 285; 180/227

[56] References Cited

U.S. PATENT DOCUMENTS

| | | | |
|---|---|---|---|
| 488,393 | 9/1918 | Douglas | 280/284 |
| 2,618,494 | 11/1952 | Guzzi | 280/283 |
| 4,058,181 | 11/1977 | Buell | 280/284 |
| 4,440,414 | 4/1984 | Wang | 280/278 X |
| 4,789,174 | 12/1988 | Lawwill | 280/284 |
| 4,809,802 | 3/1989 | Seino et al. | 180/227 |

FOREIGN PATENT DOCUMENTS

| | | | |
|---|---|---|---|
| 2609958 | 7/1988 | France | 280/284 |
| 0429917 | 2/1948 | Italy | 280/284 |
| 0432075 | 5/1948 | Italy | 280/284 |

OTHER PUBLICATIONS

Mechanical Engineering, May 1990, pp. 54-55.
"Pedal Power", Design News, Jan. 21, 1991.
Trek Advertisement published at least by Aug. 28, 1991.

Primary Examiner—Margaret A. Focarino
Assistant Examiner—Victor E. Johnson
Attorney, Agent, or Firm—Ryan, Kees & Hohenfeldt

[57] ABSTRACT

A rear suspension system for a two wheel cycle such as a bicycle or motorcycle having a vertically pivotable rear frame assembly to which the rear wheel is mounted. The rear frame assembly includes a primary swingarm which extends downwardly and rearwardly from a pivotable connection on the main frame. A rear wheel fitment is attached at the rear of this primary swingarm. A secondary swingarm is also fixed to the rear wheel fitment, and extends forwardly from the fitment at an angle below to the primary swingarm. The secondary swingarm mounts to the main frame via an attachment which has capability of permitting a change in vertical and horizontal location of the attachment point of the secondary swingarm, necessitated for rotation of the rear frame assembly about the main swingarm pivotable connection, while still providing lateral rigidity. Both swingarms pass along one side of the cycle only, with the rear wheel being mounted in a cantilever fashion from the rear wheel fitment which is also on the same one side. The system provides convenience in wheel and tire access, and also provides very high lateral and torsional rigidity in passing lateral loads from the rear tire contact patch to the main frame, due to the vertical spacing between the frame connections of the primary and secondary swingarms.

21 Claims, 12 Drawing Sheets

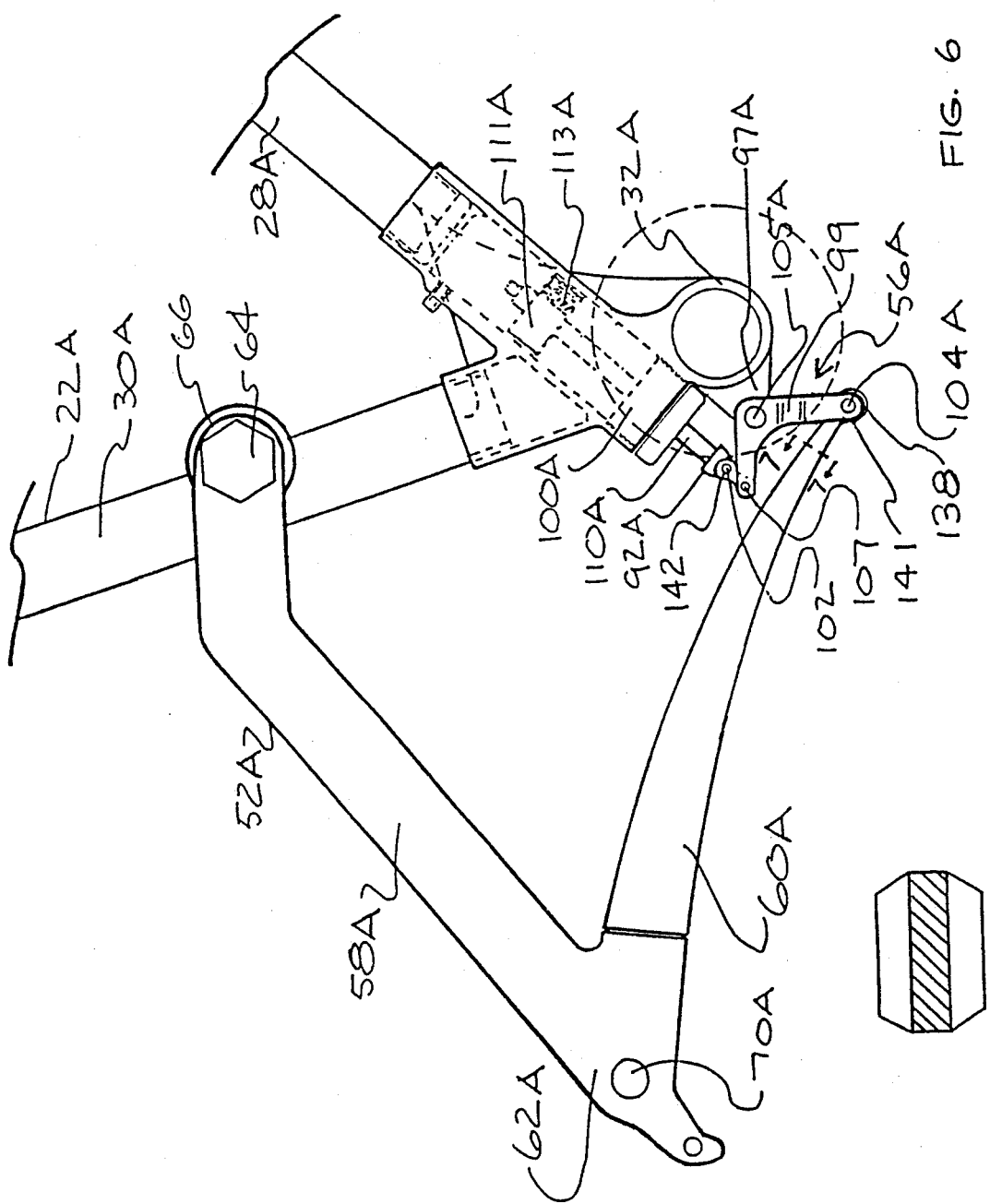

SINGLE SIDED CYCLE REAR SUSPENSION SYSTEM

BACKGROUND OF THE INVENTION

This invention relates to bicycle frame construction, and in particular to bicycle frames having rear suspensions, yet having easy access and removal of the rear wheel.

Bicycles and motorcycles were originally built with rigid frames. As the horsepower, weight and speed of motorcycles increased, and they began to be used off road, both front and rear wheel suspensions were developed and have now reached a very high degree of sophistication. Many different arrangements have been used for springing and damping rear suspensions, including complex linkages. The majority of rear suspensions on two wheeled vehicles use a fork-type rear swingarm as the main rear suspension structural member, regardless of the type of springs, damping devices and linkages used. The fork-type swingarm has a member on each side of the rear wheel, these two members being fixed together at the front pivot area, and joined at the rear by a rear axle which clamps the wheel between the two members. Changing the wheel, tire, brake, rotor, or wheel bearings requires removal of the rear axle from the swingarm, with attendant problems relating to reinstallation and alignment.

Automobiles have for many years used cantilevered stub axles which allow wheels, brakes, and so on to be removed easily, without removing the axle from the swingarm. A few two-wheeled vehicles have used a single-sided swingarm, which is generally a large section tubular member down one side of the wheel, the tubular member being attached at its front to the frame with a bearing set mounted on a single axis. Because the side loads on the wheel are transferred through this tubular member in torsion only, the member is large and heavy, yet provides only mediocre lateral and torsional rigidity.

This invention relates to improvements to the apparatus set forth above and to solutions to some of the problems raised or not solved thereby.

SUMMARY OF THE INVENTION

The invention is an improved rear wheel suspension system, especially beneficial on mountain bikes and performance motorcycles, but also useful on two wheel cycles generally, including street and highway bicycles, motorscooters, motorbikes and other motorcycles. The system permits simple wheel, tire, and brake service, is lightweight, and provides high lateral and torsional chassis rigidity.

The invention provides for a pivoting rear frame assembly which pivots about a pivot pin mounted on the main frame. This pivot pin is transverse to the plane of the wheels, and parallel to the axles. The primary swingarm is a single beam running between the pivot axis and the rear wheel fitment. A secondary swingarm or swingarm assembly reaches forward from the rear wheel mounting means to a mounting point on the main frame below the primary swingarm pivot axis.

Upward load on the rear tire causes the rear frame assembly to rotate about the pivot pin until such time as a spring device, which is activated by the upward wheel motion, is deflected sufficiently to absorb the load. While the wheel and suspension assembly is rotating about the axis, the distance between the axle and the frame attachment point of the secondary swingarm assembly changes. In order to maintain the connection, the frame attachment means of the secondary swingarm assembly must change in length and angle. This may be accomplished by connecting two links with axes parallel to the pivot shaft, with slack in the linkage when the swingarm is at its no load position, such that the links rotate to provide changing length and angle.

The change in length may also be accomplished by fabricating the secondary swingarm in a shape that allows flexibility in the plane of wheel motion, but has lateral rigidity. This could be a bowed strap of material, such as a composite, having a section much wider than tall, similar to a leaf spring. Straightening this bowed strap allows the effective length of the secondary swingarm to increase.

The structure provided according to the present invention prevents lateral loads on the tire from deflecting the wheel out of its original plane. Lateral deflection is resisted by the horizontal sections of the two swingarms added together. Torsional deflection is resisted by the horizontal sections of the swingarms acting over the vertical spacing between the arms. The vertical spacing between the locations of the mounting points on the frame reduces the loads on the frame and therefore reduces the deflection of the frame caused by the torque of a lateral tire load acting across the distance from tire contact patch to axle.

Other objects and advantages will become apparent hereinafter.

BRIEF DESCRIPTION OF THE DRAWING

FIG. 6 is a fragmentary view of a suspension system similar to that shown in FIG. 3, but constructed according to an alternative embodiment of the invention.

FIG. 7 is a cross sectional view of a secondary swingarm constructed according to the embodiment shown in FIG. 6, taken along line 7—7.

DESCRIPTION OF THE PREFERRED EMBODIMENT

Figure 1:
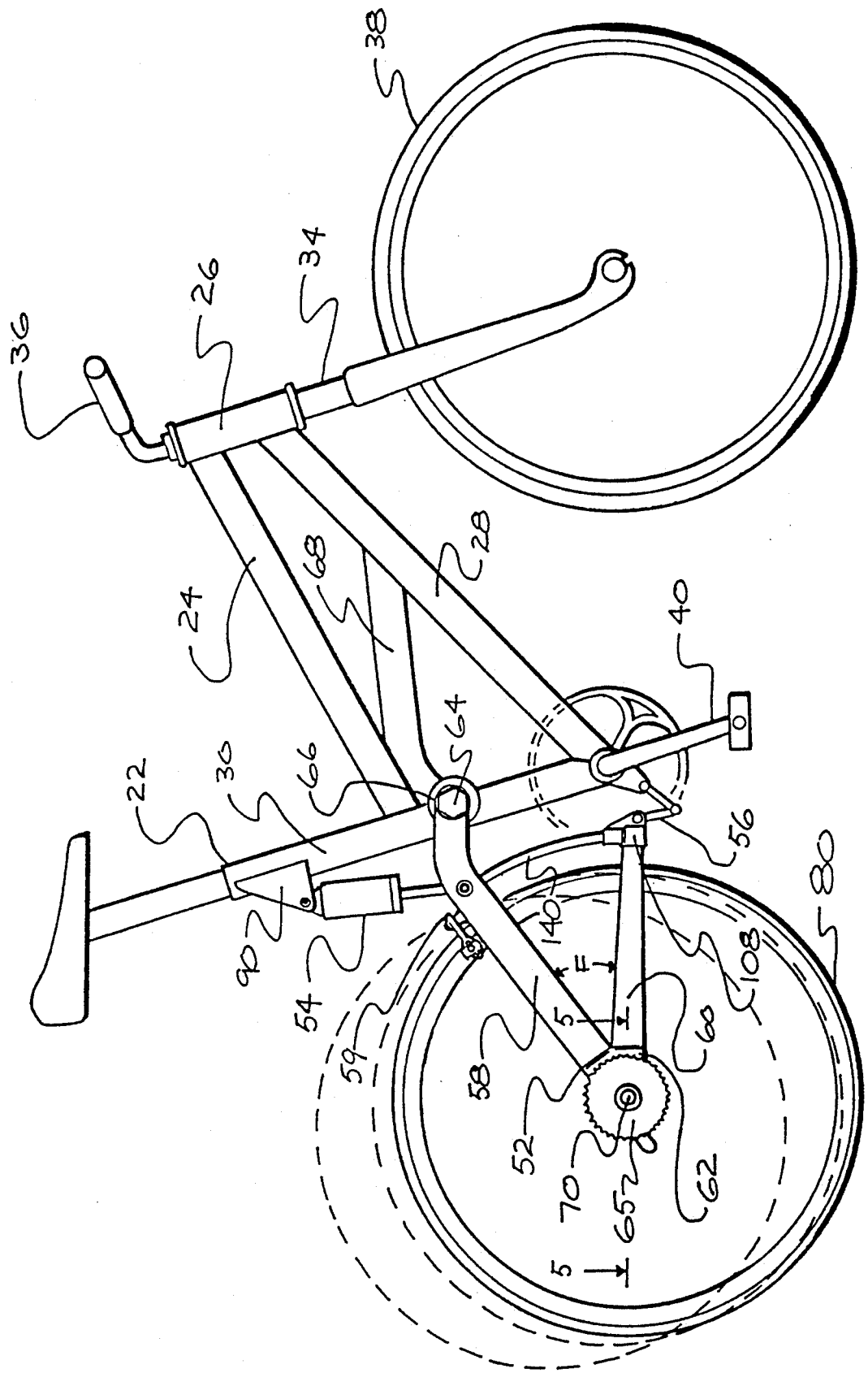
FIG. 1 is a right side elevational view of a bicycle, incorporating a rear suspension system constructed according to a preferred embodiment of the present invention, in which view the rear suspension is in its extended, or unloaded, position.

Referring now in more detail to the embodiment shown in FIGS. 1 through 5, there is shown a bicycle 20 having a main frame 22 including an inclined top tube 24. A head tube 26 is attached at its upper end to the front end of top tube 24. A down tube 28 is attached at its front end to the lower end of head tube 26. A seat tube 30 intersects the rear end of top tube 24, and connects to the rear end of down tube 28 at a bottom bracket shell 32. The front end components fitted to the main frame 22, including a front fork 34 and a handlebar 36 journaled within head tube 26, and a front wheel 38 journaled to front fork 34, are conventional and may be supplied in any appropriate manner. Similarly, the drive arrangement, including a pedal and front sprocket assembly 40 journaled to bottom bracket shell 32, a rear sprocket assembly 65 journaled to the rear suspension system 50, and a rear brake assembly 59 (FIG. 4), are not part of the invention and may be supplied by any suitable means.

In the embodiment shown in FIGS. 1 through 5, the rear suspension system 50 comprises a pivotable rear frame assembly 52, a shock absorber assembly 54, and connecting and guiding means 56. The rear frame assembly 52 comprises a primary swingarm 58, a secondary swingarm 60, and rear junction 62. As best shown in FIGS. 1 through 4, the rearwardly and downwardly extending primary swingarm 58 is pivotably connected at its front end to the right side of main frame 22. It is swingable in an arc about a pivot pin 64 extending through a bearing housing 66 which is welded or otherwise affixed to the seat tube 30. In order to strengthen main frame 22 to carry the load imposed by rear frame assembly 52, a triangulating reinforcement tube 68 may be secured as by welding to the seat tube 30 and down tube 28. The primary swingarm 58 has at its rear end a rear junction 62 for mounting a rear axle 70 for a rear wheel and tire assembly 80.

Tubular shock absorber assembly 54 is mounted between the primary swingarm 58 and the top of the seat tube 30. While any suitable shock absorber assembly may be used, in the embodiment shown in FIG. 3, shock absorber assembly 54 comprises a cylindrical body 82 closed at the top end by an upper end cap 84. End cap 84 has an upwardly directed axial extension 86 pivotably mounted on a pin 88, which is in turn pivotably connected to one or more brackets 90 secured as by welding to seat tube 30, such as at the rear side. A lower cap 100 seals the bottom end of cylinder 82. A piston 111 with dampening apertures 113 to regulate the flow of liquid or gas through the piston is supported on a piston rod 110. Piston rod 110 extends through a seal 101 in lower cap 100, and is threadedly secured in a lower mount 92. Lower mount 92 is pivotably attached to the primary swingarm 58 by a transverse pin 102. The fluid medium in the cylinder 82 may be hydraulic or gas or a combination thereof. In this embodiment a main spring 122 is provided internally to the cylinder 82, and is positioned for compression between the upper end cap 84 and the piston 111, being mounted concentrically to the cylindrical body 82.

Figure 3:
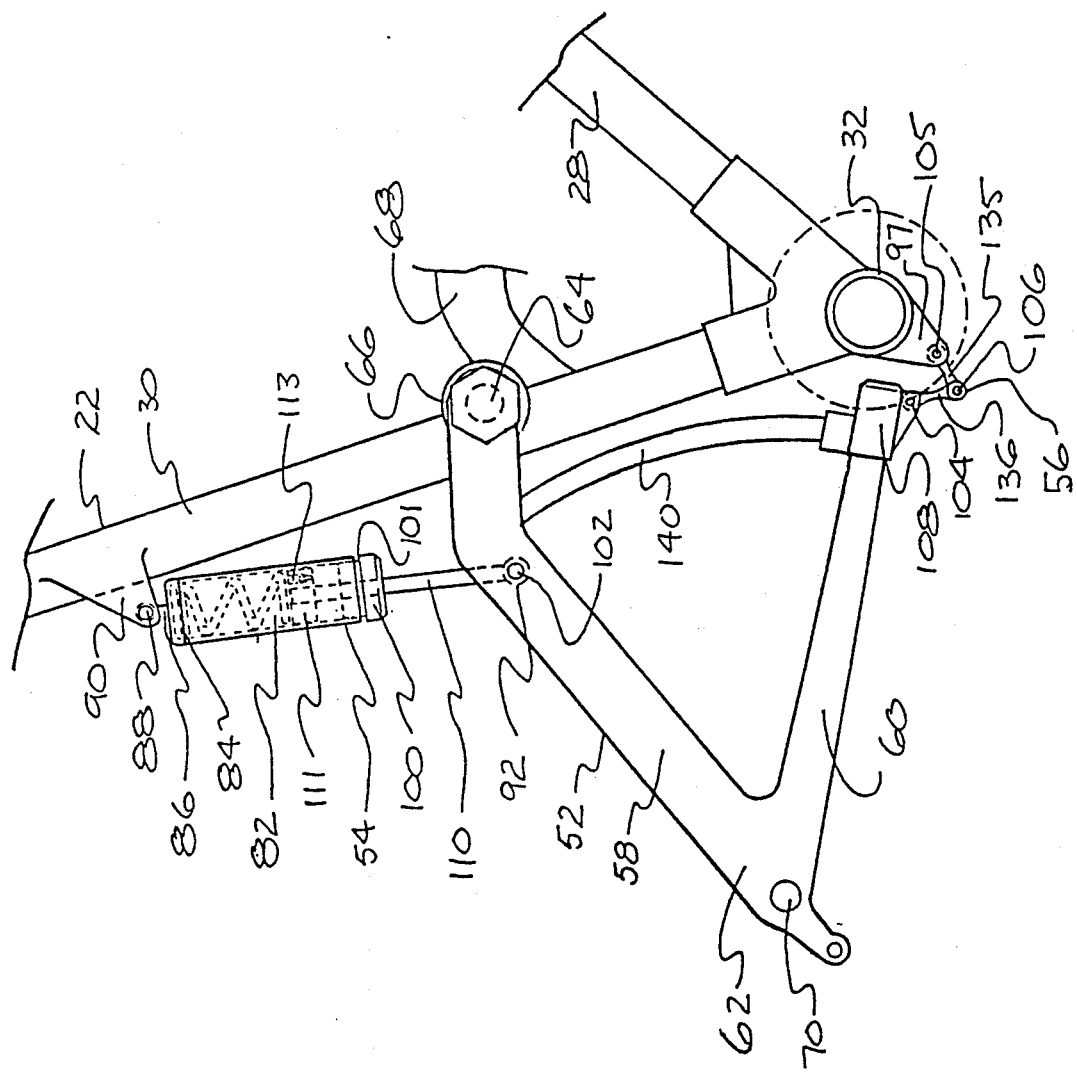
FIG. 3 is a fragmentary enlarged view of the suspension system shown in FIG. 1.
Figure 4:
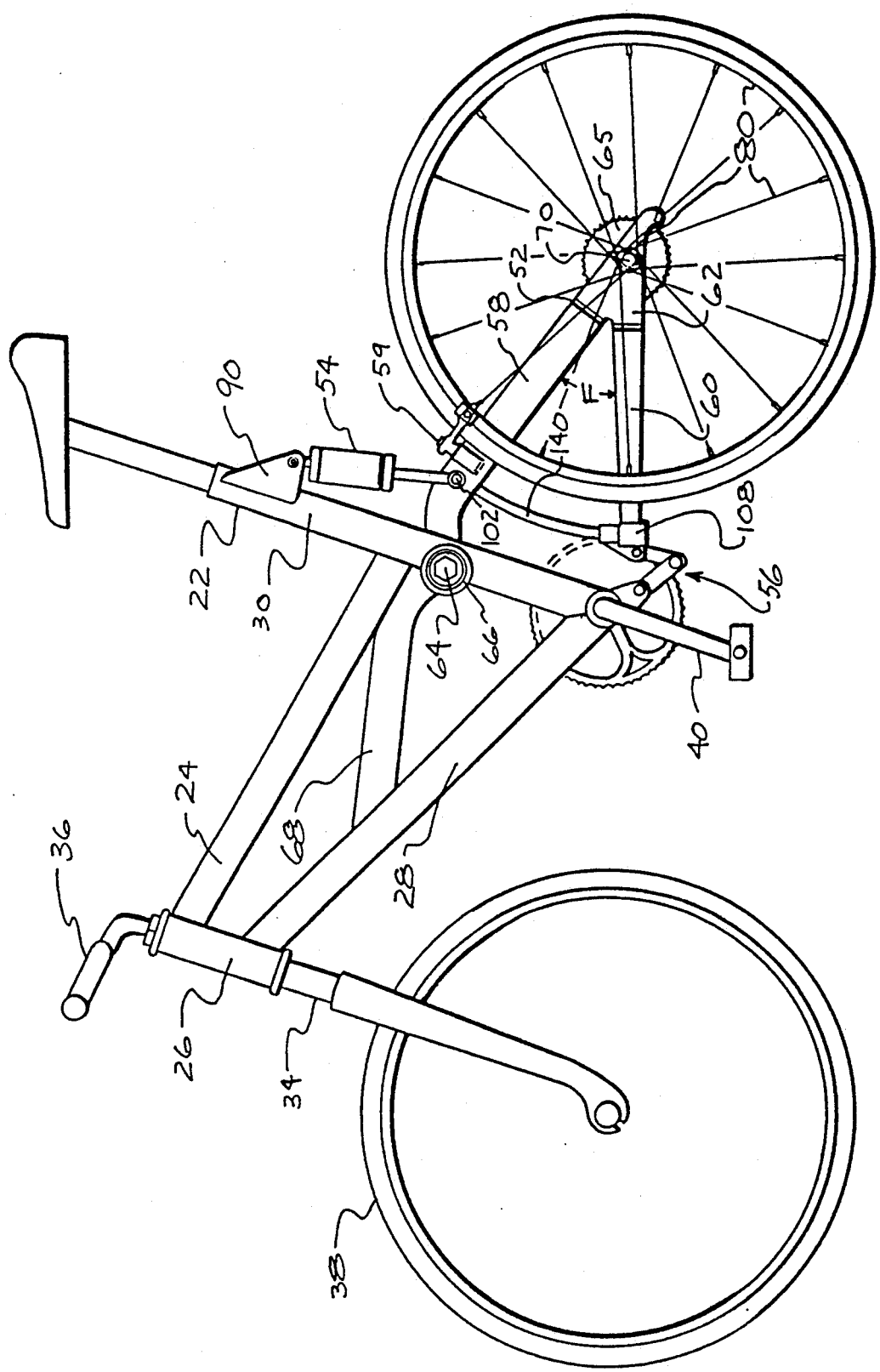
FIG. 4 is a left side elevational view of the bicycle shown in FIG. 1.

As stated above, the pivotable rear frame assembly 52 includes a secondary swingarm 60. Secondary swingarm 60 comprises a tube or beam secured as by welding, solder, or adhesive to the rear junction 62 and extending substantially horizontally forward. As best shown in FIG. 3, a point or junction 108 along secondary swingarm 60 forward of junction 62 is connected as by welding, solder, or adhesive at junction 108 to a substantially vertical cross tube 140, which is connected at its other end by similar means to the front section of the primary swingarm 58 underneath the lower mount 92 of the shock absorber 54.

In this embodiment connecting and guiding means 56 includes links 135 and 136, and associated pivot pins. In particular, one end of link 136 is connected to the junction 108 at the forward end of the secondary swingarm 60 via a pivot pin 104, while the other end of link 136 is connected via another pivot pin 106 to a first end of a second link 135. The opposite end of link 135 is mounted via a pivot pin 105 to one or more mount plates 97 attached to bearing shell 32, as part of frame 22.

Figure 5:
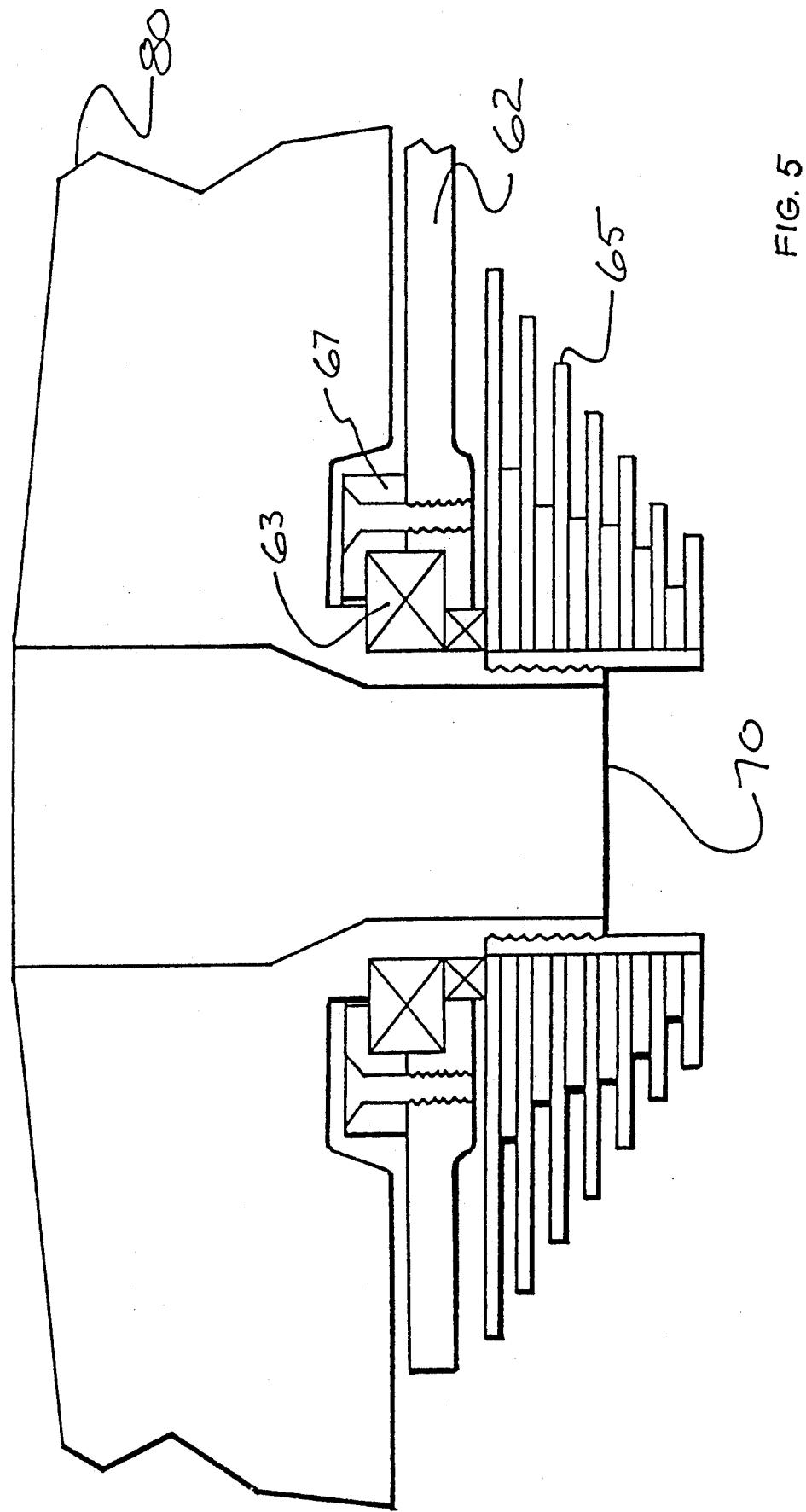
FIG. 5 is a cross sectional view of the rear wheel and fitment, including the rear axle, rear sprocket set, and bearings, of the embodiment shown in FIGS. 1, taken generally along line 5—5.
Figure 8:
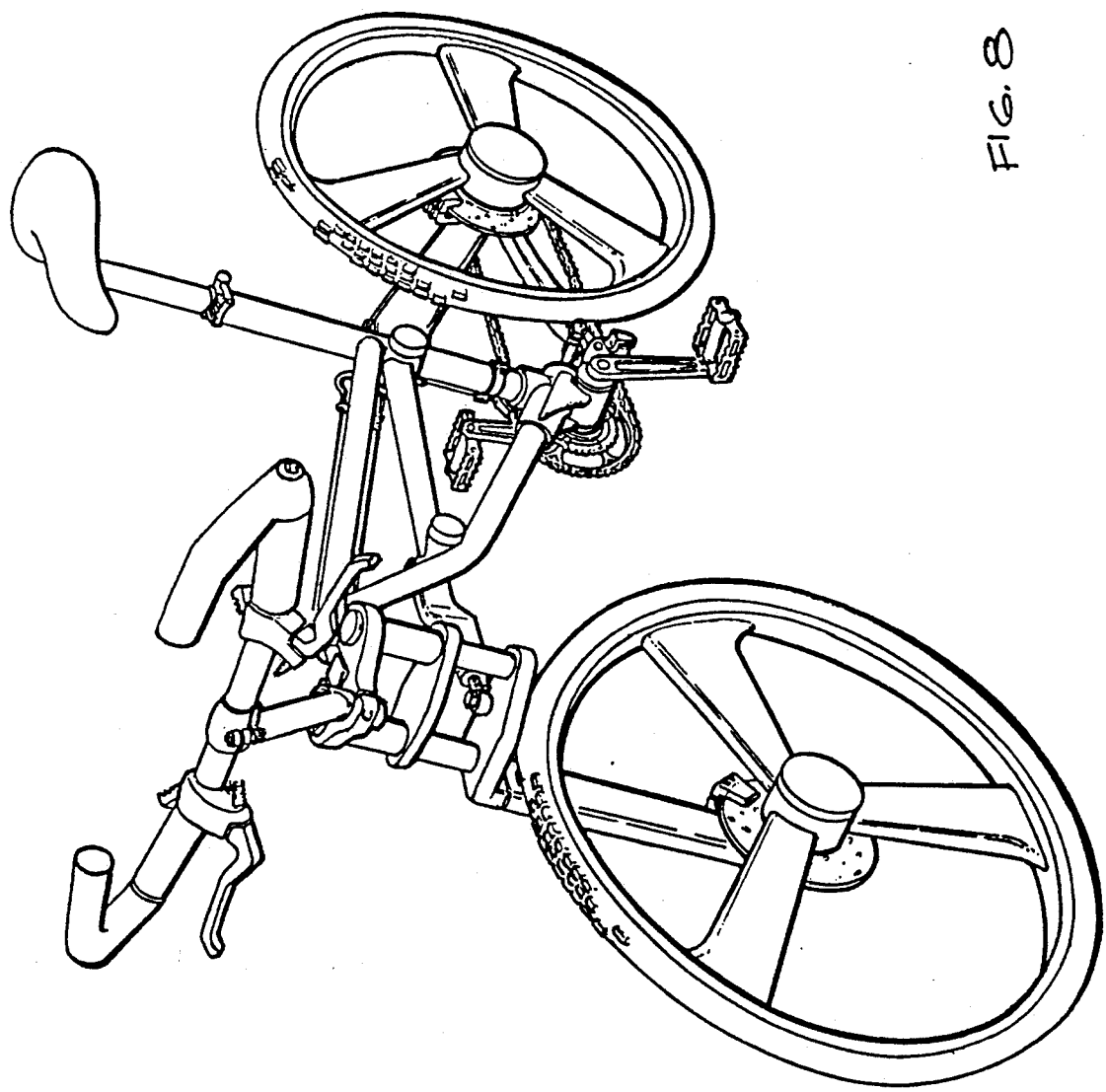
FIG. 8 is a left front perspective view of a bicycle having a rear suspension constructed according to the embodiment shown in FIG. 6.

As best shown in FIG. 5 and as indicated above, the rear wheel and tire assembly 80 has an axle 70 fixed to said wheel assembly by welding, bonding, casting or the like. The axle 70 is inserted through the inner race of bearing 63, and bearing 63 is fixed at its outer race by clamping of bearing retainer 67 to rear junction 62. A driven sprocket assembly 65 is attached to axle 70 by detachable means such as threads. Sprocket assembly 65 serves as a nut to retain axle 70, and thereby wheel assembly 80, to the inner race of bearing 63. Wheel assembly 80, axle 70, and sprocket assembly 65 are thereby free to rotate together as an assembly with the inner race of bearing 63 about the axis of the axle, but are fixed to rear junction 62.

Figure 2:
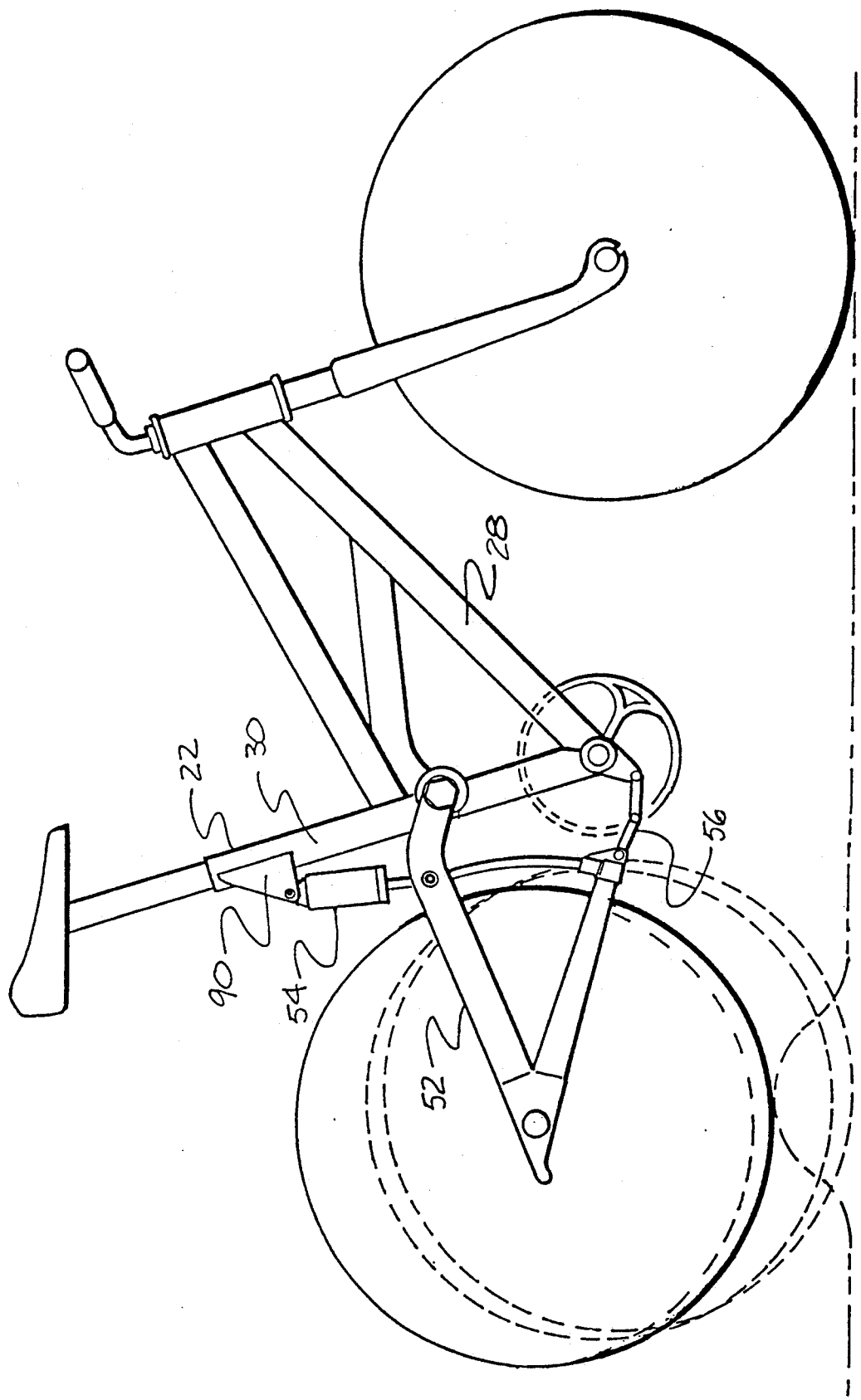
FIG. 2 is a view similar to FIG. 1 showing the rear suspension system in a loaded, or impact absorbing position.

In operation, then, as can be seen by comparing FIGS. 1 and 2, when rear wheel and tire assembly 80 encounters a bump 114, it causes rear frame assembly 52 to rotate upward about pin 64. This action causes shock absorber 54 to be compressed at the same time forward junction 108 rotates away from bottom bracket shell 32, thereby extending links 135 and 136. As the bump 114 is passed, the process is reversed. Thus rear wheel and tire assembly 80 is forced to maintain closer contact with the surface on which the bicycle 20 is being ridden than if there were no rear suspension system 50. At the same time, connecting and guiding means 56 prevent any substantial torsional motion of rear wheel and tire assembly 80 and rear frame assembly 52 with respect to the bottom bracket shell 32.

An alternative embodiment of the invention is shown in FIGS. 6 through 9. Components that are identical to those in the above described embodiment are designated with identical reference numerals. Components serving similar functions as in the first embodiment but not necessarily identical in structure carry like numbers with the suffix "A" added.

In this embodiment secondary swingarm 60A is an elongated curved beam with a tapering thickness as shown in FIG. 6, and a cross section as shown in FIG. 7 wherein the thickness, especially at the forward end, is substantially greater than the width. Connecting and guiding means 56A includes bellcrank 99 and associated pivot pins. In particular, pivot pin 104A is mounted through an eye 138 formed at the front end of secondary swingarm 60A. This eye 138 is formed through and parallel to the wide dimension of the section of secondary swingarm 60A. Pin 104A is oriented substantially parallel to the axis of the rear axle 70 and the axis of the swingarm pivot 64, and passes through one or more apertures 141 formed for that purpose in bellcrank 99. Bellcrank 99 is mounted to mount plate(s) 97A attached to bearing shell 32A, as part of frame 22A, by another pivot pin 105A, the axis of pivot pin 105A being parallel to the axis of pivot pin 104A. As rear wheel assembly 80A rises with respect to frame 22A, such as when a bump in the road is encountered, the rear frame assembly 52A rotates about pivot 64. If bellcrank 99 were not in place, pivot pin 104A would rotate with rear frame assembly 52A in its original relaxed radial distance from pivot 64. Because pin 104A is attached to bellcrank 99, it is forced instead to rotate about pivot pin 105A at the radial distance fixed by bellcrank 99. Therefore, secondary swingarm 60A is flexed upwards by the force exerted upon it by pin 104A, and acts like a leaf spring, exerting a progressively greater force as it is further deflected from its original relaxed position.

On the opposite end of bellcrank 99, pivot pin 107 attaches to one end of link 142. Link 142 attaches on its opposite end to pivot pin 102, which rotates in the end of lower mount 92A. Lower mount 92A is threadedly secured to shock absorber piston rod 110A, which operates a hydraulic or gas damper piston 113A in a manner similar to the shock absorber 54 of the embodiment shown in FIGS. 1 through 5.

Figure 9:
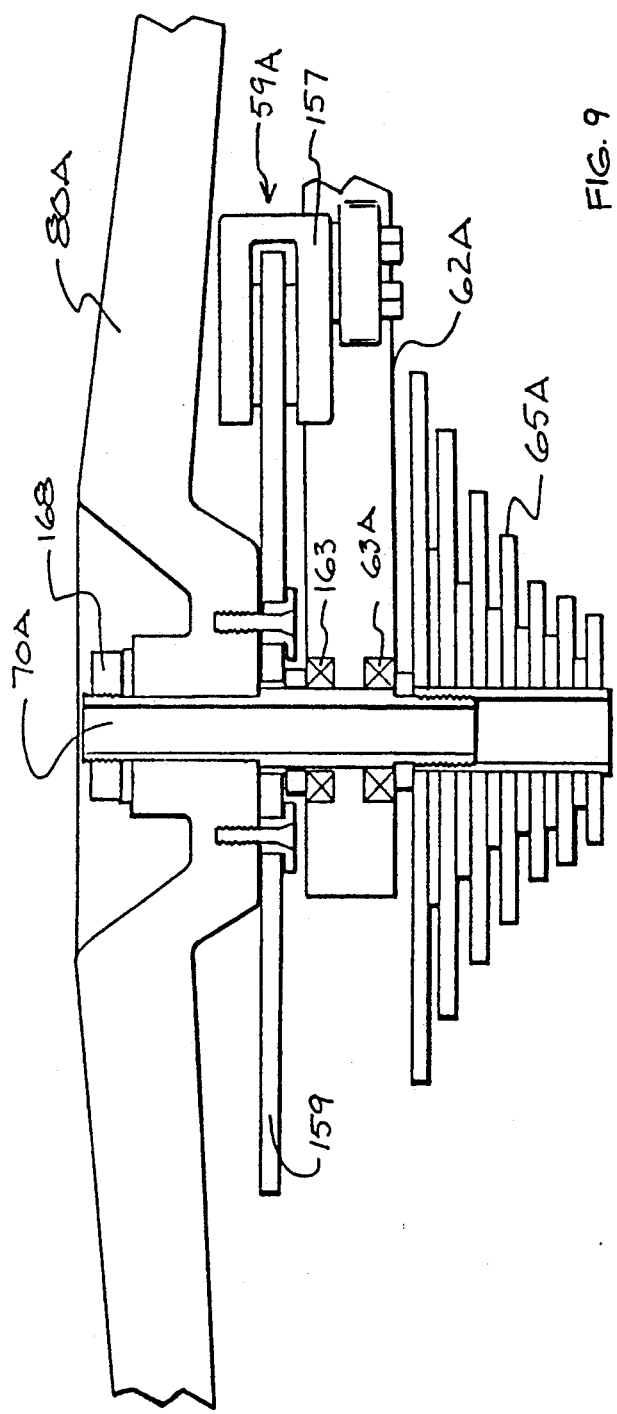
FIG. 9 is a fragmentary view showing the rear wheel fitment of the embodiment shown in FIG. 6.

As best shown in FIG. 9, in this embodiment axle 70A is fixed to the hub of rear wheel tire assembly 80A by nut 168, and rotates within junction 62A on inner bearing 63A and outer bearing 63A. Driven sprocket assembly 65A is attached to axle 70A via threaded means or the like. Brake means 59A are substantially conventional, in this case comprising a brake disc 159 fixed to wheel assembly 80A, and a brake caliper 157 fixed to junction 62A.

Figure 10:
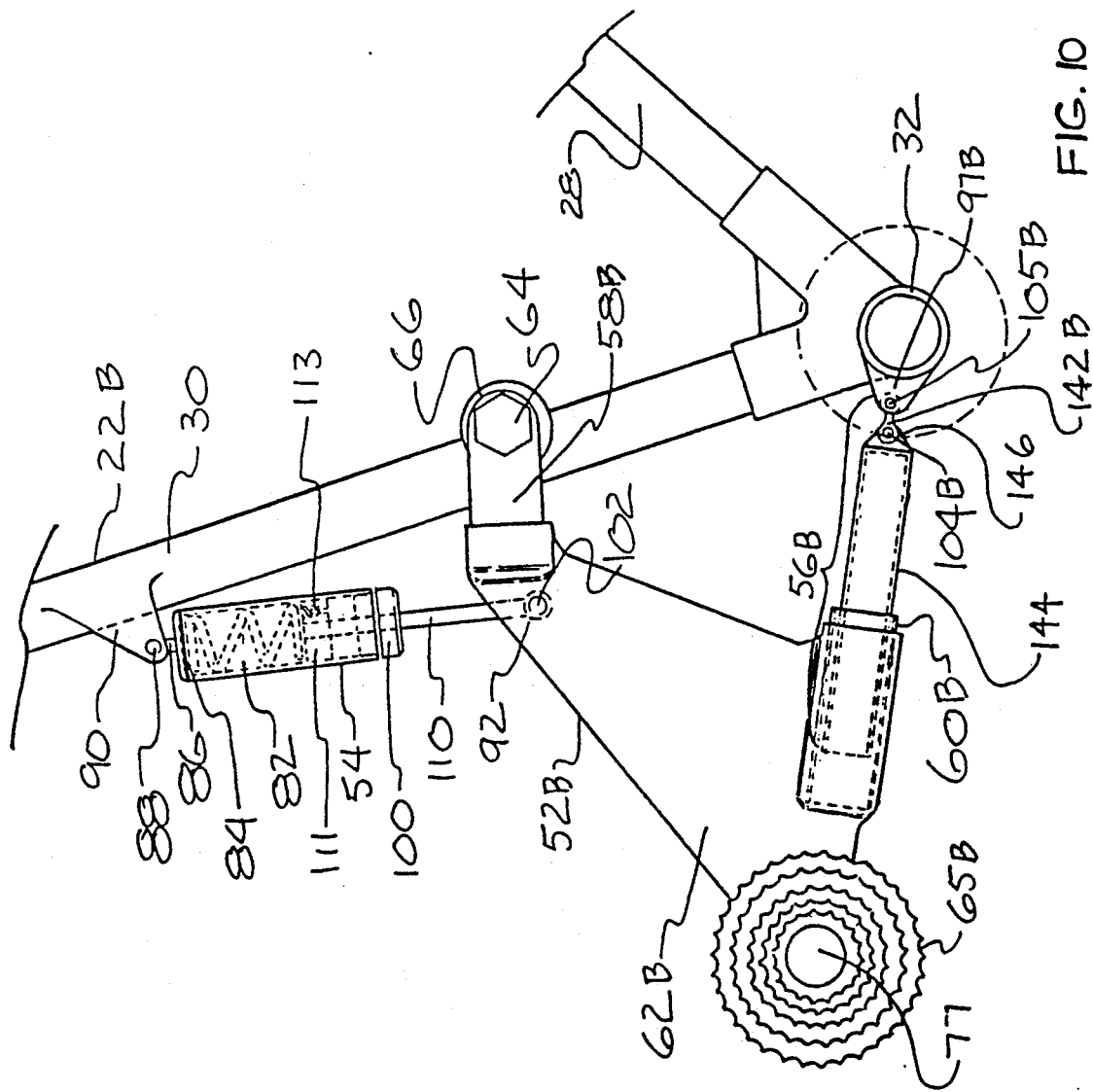
FIG. 10 is a fragmentary view of a suspension system constructed according to another alternative embodiment of the invention.
Figure 11:
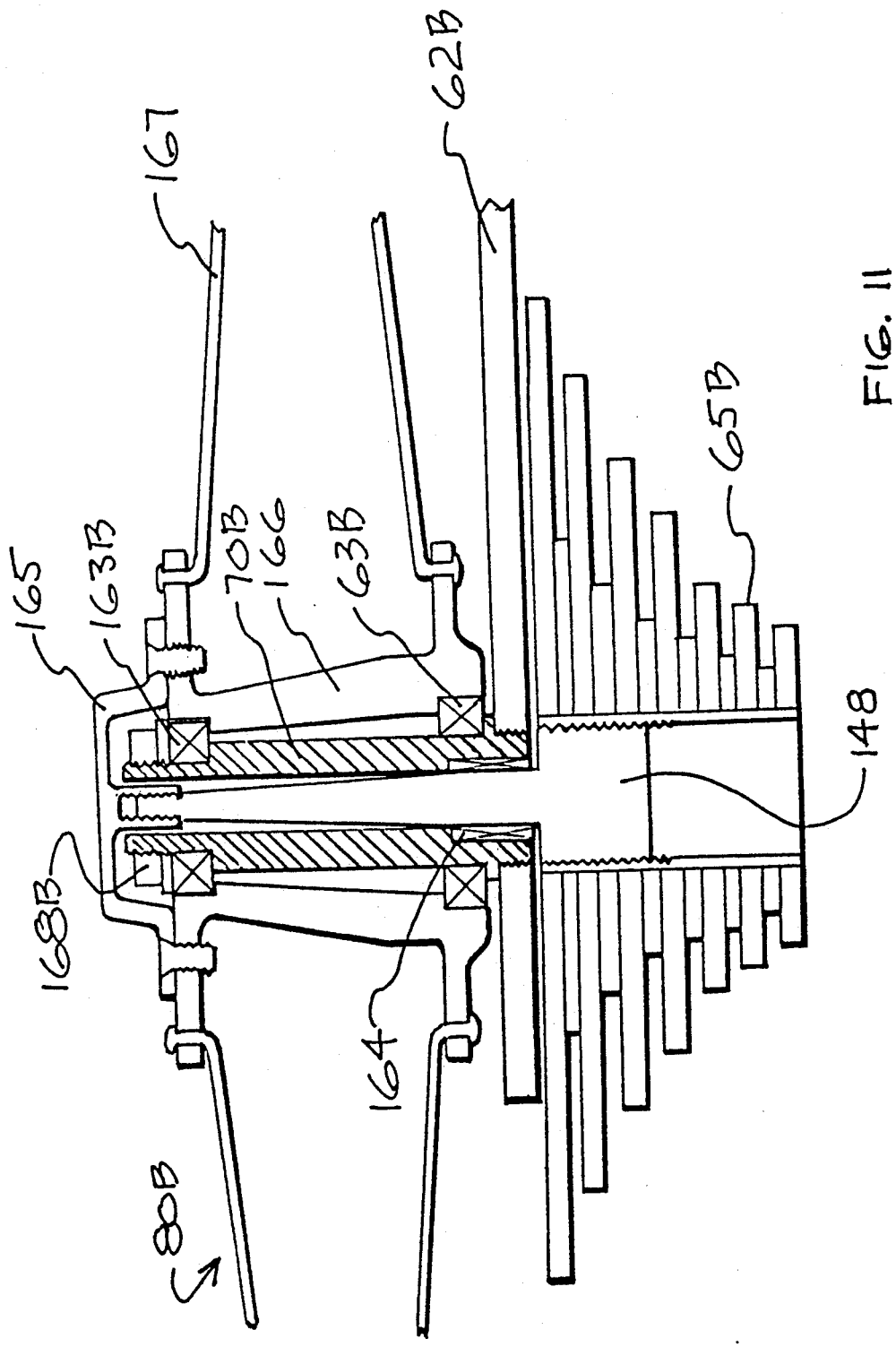
FIG. 11 is a fragmentary view showing the rear wheel fitment of the embodiment shown in FIG. 10.

Another alternative embodiment of the invention is shown in FIGS. 10 and 11. In these drawing figures, as in FIGS. 6 through 9, components that are identical to those in the first described embodiment are designated with identical reference numerals. Components serving similar functions as in the first embodiment but not necessarily identical in structure carry like numbers, except this time with the suffix "B" added.

In this embodiment, as best shown in FIG. 10, primary swingarm 58B is a short tubular or beam attachment to an enlarged junction 62B. Junction 62B can be a casting, a molded composite structure, a fabricated sheet metal structure or the like. Junction 62B has a hollow tubular housing 60B attached which serves as a secondary swingarm. In this embodiment connecting and guiding means 56B includes a tubular cylinder 144 slidable inside housing 60B, and an end cap 146 fixed to cylinder 144 as by welding. End cap 146 has a hole in its forward end through which passes pivot pin 104B, thereby being pivotably connected to one end of link 142B, the opposite end of link 142B being pivotably connected to mount plate(s) 97B attached to bearing shell 32B, as part of frame 22B. The pivot axes of pins 104B and 105B are parallel with the axis of the main pivot shaft 64 for the rear frame 52B.

As best shown in FIG. 11, the rear wheel mounting consists of junction 62B, to which hollow tubular rear axle 70B is fixed by means such as threading or welding. Rear wheel and tire assembly 80B is shown in FIG. 11 with wire spokes 167, although any suitable construction of rear wheel and tire assembly is within the scope of the invention. Assembly 80B includes hub 166, and rotates on fixed axle 70B via inner bearing 63B and outer bearing 163B. Wheel assembly 80B is held onto axle 70B via a nut 168B. Drive to the rear wheel 80B is transferred from driven sprocket assembly 65B through drive shaft 148, which rotates on bearing 164 inside the hollow axle 70B, to drive flange 165 which is bolted to hub 166.

Thus in operation when wheel 80 encounters a bump and begins to rise over it, junction 62B and primary swingarm 58B begin to rotate about the pivot pin 64. This action causes housing 60B to slide off of cylinder 144, and shock absorber 54 to be compressed. Again, as the bump is passed, the process is reversed. Connecting and guiding means 56B thus prevents any substantial torsional motion of rear wheel and tire assembly 80 and rear frame assembly 52 with respect to the bottom bracket shell 32.

Figure 12:
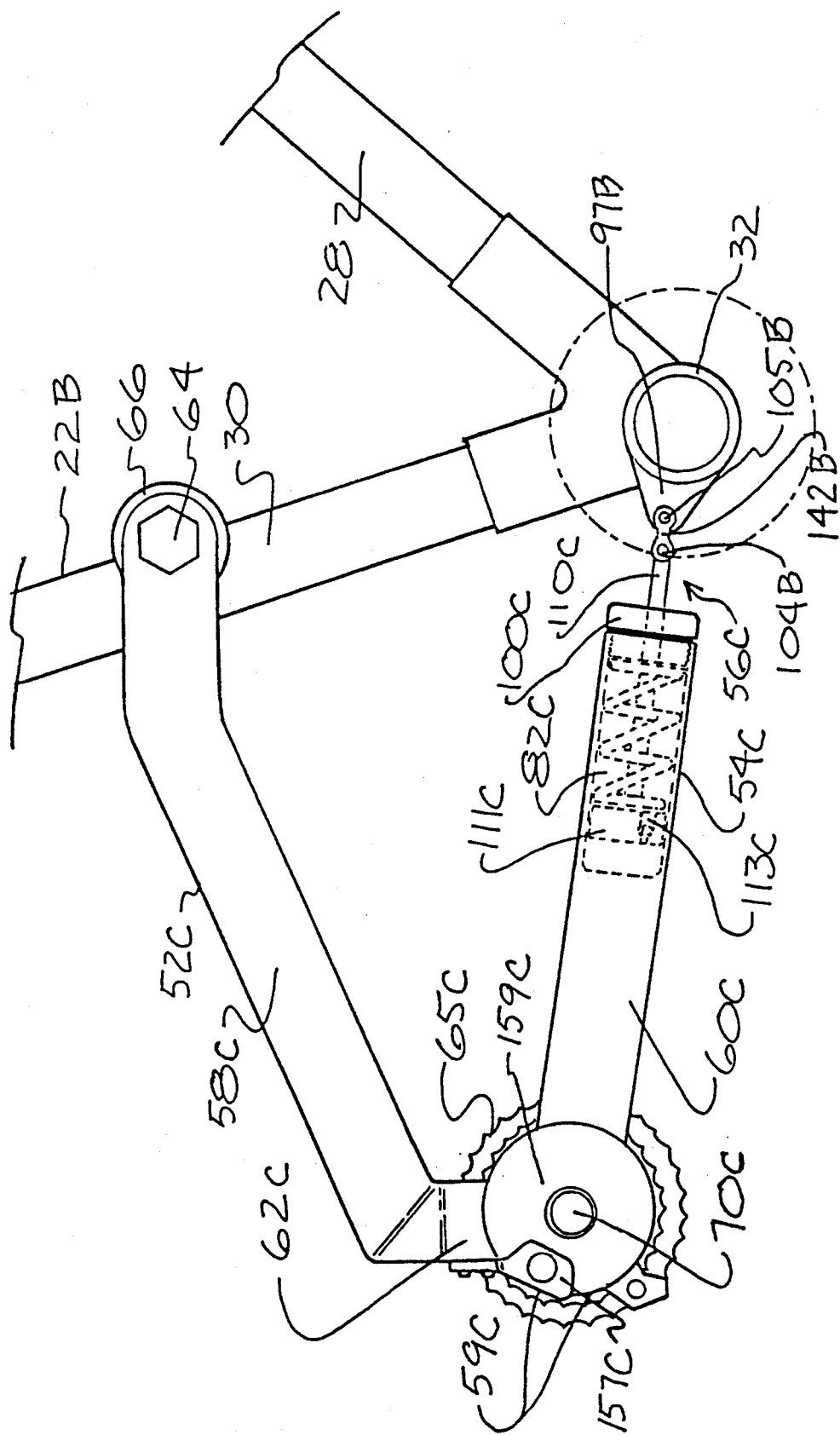
FIG. 12 is a fragmentary view of a suspension system constructed according to yet another alternative embodiment of the invention.

Another alternative embodiment of the invention is shown in FIG. 12. In this drawing figure, as in the earlier figures, components that are identical to those in earlier described embodiments are designated with identical reference numerals. Components serving similar functions as in earlier embodiments but not necessarily identical in structure carry like numbers, except this time with the suffix "C" added.

In this embodiment a liquid or gas damped shock absorber assembly 54C is incorporated within secondary swingarm 60C, so that piston 111C sliding within cavity 82C and piston rod 110C sliding in end cap 100C serve in similar fashion as the sliding cylinder 144 within housing 60B in the embodiment shown in FIG. 10. In this embodiment junction 62C provides substantial vertical spacing of primary swingarm 58C and secondary swingarm 60C near rear axle 70C. Rear wheel mounting is similar to that of the embodiment shown in FIG. 11, except that brake disc 159C is mounted on the axle 70C on the side of junction 62C away from the wheel and tire assembly (not shown in FIG. 12), while driven sprocket assembly 65C is mounted directly to, and on the same side of junction 62C as, the wheel tire assembly.

Since it is so similar to the embodiment shown in FIGS. 10 and 11, this embodiment functions in basically the same manner. That is, when the wheel encounters a bump and begins to rise over it, primary swingarm 58C begins to rotate about the pivot pin 64. This action causes cavity 82C to slide off of piston 111C and piston rod 110C, shock absorber 54C thus being extended. And as the bump is passed, the process is reversed.

Figure 13:
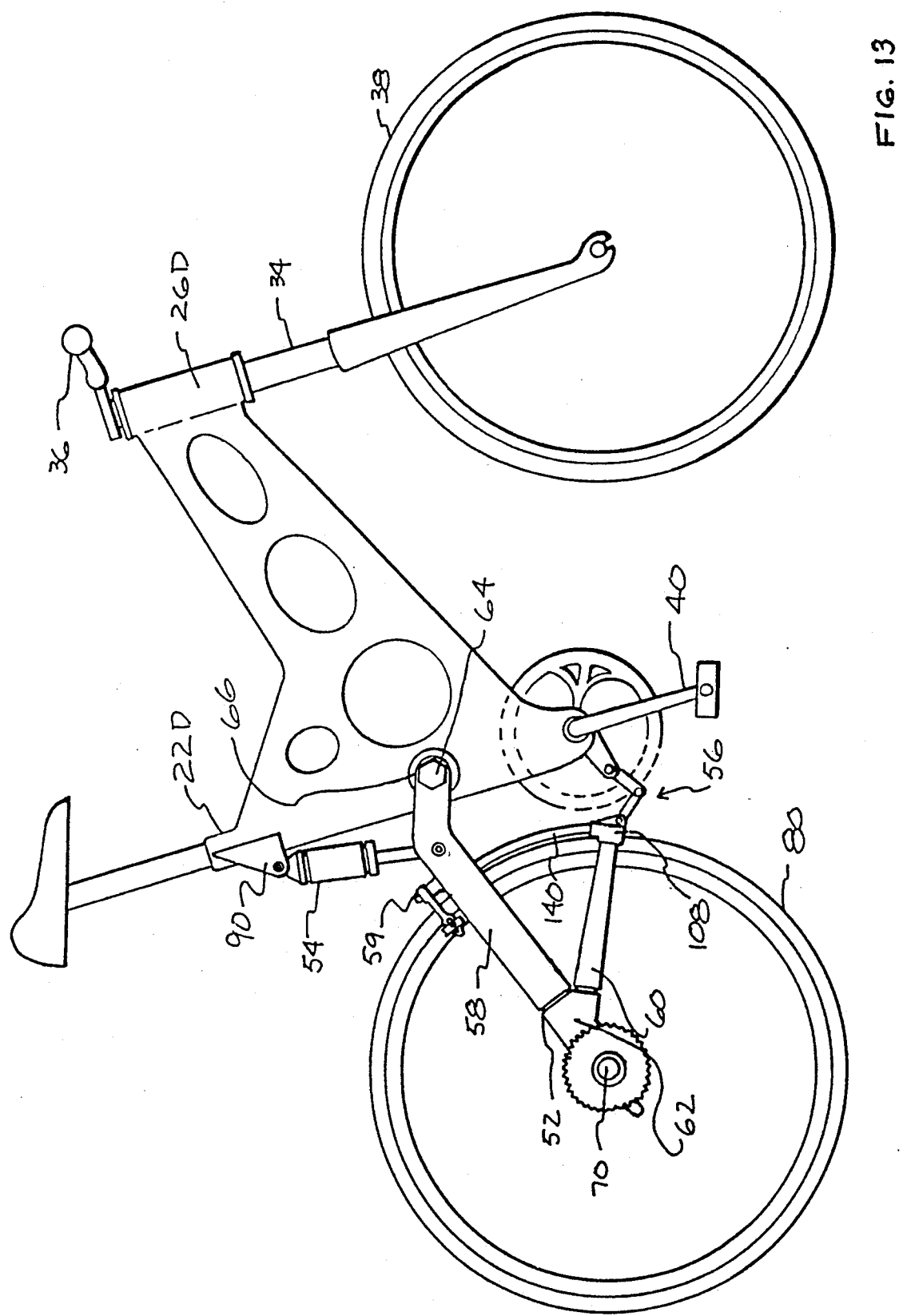
FIG. 13 is a right side elevational view of a bicycle incorporating a rear suspension system constructed according to an embodiment of the invention similar to that shown in FIG. 1, but mounted to a different frame configuration.

Yet another alternative embodiment is shown in FIG. 13. This embodiment features a monocoquestyle non-tubular main frame 22D, with all other components substantially the same as in the embodiment shown in FIG. 1.

While particular examples of the present invention have been shown and described, changes and modifications may be made without departing from the basic invention. Accordingly, the aim of the appended claims is to cover all such changes and modifications which are included within the spirit and scope of the invention.

I claim:

1. A single-sided rear suspension system for mounting a rear wheel, rotatable about an axis, to a cycle having a main frame, said suspension system comprising:

A) a pivotable rear frame assembly including:

1) a single primary swingarm having front and rear ends, and pivotably connected at the front end to a pivot point on the main frame, 2) wheel mounting means at the rear end of the primary swingarm for mounting said rear wheel to one side only of said primary swingarm, said primary swingarm and wheel mounting means pivoting to allow for up and down movement of said rear wheel relative to the main frame, and 3) a secondary swingarm having two ends, a forward end and a rearward end, one end connected to the wheel mounting means and pivotably movable therewith about said pivot point;

B) spring means having two ends, connected at one end to the main frame and connected at the opposite end to the pivotable rear frame assembly, said spring means urging said pivotable rear from assembly toward an unloaded position with respect to said main frame; and C) connecting and guiding means for connecting the main frame to the forward end of the secondary swingarm, and allowing rotational motion of said forward end of the secondary swingarm about the pivot point while resisting lateral motion of the forward end of the secondary swingarm with respect to the main frame;

whereby lateral load to the rear wheel is resisted from torsionally as well as laterally deflecting the rear frame assembly with respect to the main frame by both the pivot point and by the connecting and guiding means, said pivot point and said connecting and guiding means having no substantial lateral freedom of motion.

2. A rear suspension system according to claim 1 in which the connecting and guiding means includes a pair of links pivotably connected to each other, one of said links pivotably connected to the forward end of the secondary swingarm, and the other of said links pivotably connected to the main frame, all of said links pivotable about axes parallel with the axis of rotation of said rear wheel.

3. A rear suspension system according to claim 1 in which the connecting and guiding means includes a bellcrank pivotably mounted to the main frame, which bellcrank actuates the spring means.

4. A rear suspension system according to claim 1 in which the rear wheel mounting means includes an axle rotatably mounted in a junction means to which primary and secondary swingarms attach, said axle having ends, said rear wheel mounted at one end of said axle and a drive sprocket mounted at the opposite end of said axle.

5. A rear suspension system according to claim 1, in which the rear wheel mounting means includes a fixed cantilever axle attached on one end to a junction to which primary and secondary swingarms attach, said axle having the wheel and a drive sprocket rotating on said axle in unison.

6. A rear suspension system according to claim 1, in which the rear wheel mounting means includes a hollow axle affixed to a junction to which said primary and secondary swingarms attach, said axle having said wheel rotatably mounted on one side of said junction and a drive sprocket means rotatably mounted on an opposite side of said junction, said wheel being driven by said drive sprocket via a drive shaft routed through said hollow axle.

7. A rear suspension system according to claim 1 in which the rear wheel mounting means includes an axle rotatably mounted in a junction to which said primary and secondary swingarms attach, said rear wheel and a drive sprocket mounted on said axle one side of said junction and braking means mounted on an opposite side of said junction.

8. A single-sided rear suspension system for a cycle having a main frame, said suspension system comprising:

A) a pivotable rear frame assembly including:

1) a single primary swingarm, having a front end and a rear end, said primary swingarm pivotably connected at the front end to a pivot point on the main frame, 2) wheel mounting means at the primary swingarm rear end for mounting of a wheel to one side only of said primary swingarm, 3) said swingarm and wheel mounting means pivoting as a unit to allow for up and down movement of said wheel relative to the main frame, and 4) a secondary swingarm having one end connected to the wheel mounting means and extending forwardly therefrom to terminate in a forward end, and pivotable therewith about the pivot point;

B) a shock absorber assembly and a spring means, each having two ends, and each connected at one end to a portion of the main frame and having coupling means for connecting the opposite end of each to the pivotable rear frame assembly; and C) connecting and guiding means connecting said frame to the forward end of the secondary swingarm, and having means to allow rotational motion with respect to the main frame of the secondary swingarm about the pivot point, while resisting lateral motion of the forward end of the secondary swingarm with respect to the main frame;

whereby lateral load to the wheel is resisted from torsionally as well as laterally deflecting the pivotable rear frame assembly with respect to the main frame by the pivot point and by the connecting and guiding means, neither said pivot point nor said connecting and guiding means having any substantial lateral freedom of motion.

9. A rear suspension system according to claim 8 in which the wheel is rotatable about an axle, and in which the connecting and guiding means includes a pair of links pivotably connected to each other, one link pivotably connected to the forward end of the secondary swingarm, and the other link pivotably connected to the main frame, all of said links pivotable about axes substantially parallel with the axle.

10. A rear suspension system according to claim 8 in which the connecting and guiding means includes a bellcrank pivotably mounted to the main frame, which bellcrank actuates the shock absorber.

11. A rear suspension system according to claim 8 in which the rear wheel mounting means includes an axle rotatably mounted in a junction to which said primary and secondary swingarms attach, said axle having ends, said wheel mounted on one end of said axle and a drive sprocket mounted on the opposite end.

12. A rear suspension system according to claim 8, in which the rear wheel mounting means includes a fixed cantilever axle attached on one end to a junction to which said primary and secondary swingarms attach, said axle having the wheel and a drive sprocket rotating as a unit on said axle.

13. A rear suspension system according to claim 8, in which the rear wheel mounting means includes a hollow axle affixed to a junction to which said primary and secondary swingarms attach, said axle having the wheel rotatably mounted thereon on one side of said junction and a drive sprocket rotatably mounted thereon on an opposite side of said junction, said wheel being driven by said drive sprocket by a drive shaft routed through said hollow axle.

14. A rear suspension system according to claim 1 or claim 8 in which the connecting and guiding means and the spring means includes a curved elongated extension of the secondary swingarm, which extension has flexibility vertically but is substantially rigid laterally.

15. A rear suspension system according to claim 14 in which the connecting and guiding means further includes link means pivotably connected between the forward end of the secondary swingarm and the main frame, and pivotable only about axes substantially parallel with the axis of rotation of the wheel.

16. A rear suspension system according to claim 14 in which the connecting and guiding means further includes a bellcrank pivotably mounted to the main frame, which bellcrank actuates the shock absorber.

17. A rear suspension system according to claim 14 in which the rear wheel mounting means includes an axle rotatably mounted to a junction to which primary and secondary swingarms attach, having said rear wheel mounted on one end of said axle and a drive sprocket mounted on the opposite end.

18. A rear suspension system according to claim 14, in which the rear wheel mounting means includes a fixed cantilever axle attached on one end to a junction to which primary and secondary swingarms attach, said axle having the wheel and a drive sprocket rotating on said axle in unison.

19. A rear suspension system according to claim 14, in which the rear wheel mounting means includes a hollow axle fixed to a junction to which said primary and secondary swingarms attach, said axle having the wheel rotatably mounted on one side of said junction and a drive sprocket rotatably mounted on an opposite side of said junction, said wheel being driven by said drive sprocket by a drive shaft routed through said hollow axle.

20. A rear suspension system according to claim 14 in which the rear wheel mounting means includes an axle rotatably mounted in a junction to which said primary and secondary swingarms attach, said wheel and a drive sprocket mounted on one side of said axle and braking means mounted on an opposite side of said axle.

21. A rear suspension system according to claim 14 in which the rear wheel mounting means includes an axle rotatably mounted to a junction to which said primary and secondary swingarms attach, said wheel and drive sprocket mounted on one end of said axle and braking means mounted on an opposite end of said axle.

* * * * *